(12) United States Patent
Sugimori et al.

(10) Patent No.: US 12,132,225 B2
(45) Date of Patent: Oct. 29, 2024

(54) NON-AQUEOUS ELECTROLYTE SECONDARY BATTERY

(71) Applicant: Panasonic Intellectual Property Management Co., Ltd., Osaka (JP)

(72) Inventors: Masanori Sugimori, Osaka (JP); Yasunori Baba, Hyogo (JP); Katsunori Yanagida, Hyogo (JP); Nobuhiro Hirano, Osaka (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 657 days.

(21) Appl. No.: 17/414,172

(22) PCT Filed: Dec. 11, 2019

(86) PCT No.: PCT/JP2019/048585
§ 371 (c)(1),
(2) Date: Jun. 15, 2021

(87) PCT Pub. No.: WO2020/137561
PCT Pub. Date: Jul. 2, 2020

(65) Prior Publication Data
US 2022/0037740 A1 Feb. 3, 2022

(30) Foreign Application Priority Data
Dec. 26, 2018 (JP) .................................. 2018-243774

(51) Int. Cl.
*H01M 50/446* (2021.01)
*H01M 4/02* (2006.01)
(Continued)

(52) U.S. Cl.
CPC ....... *H01M 50/446* (2021.01); *H01M 50/443* (2021.01); *H01M 50/449* (2021.01); *H01M 2004/028* (2013.01); *H01M 10/0525* (2013.01)

(58) Field of Classification Search
CPC .................................................. H01M 50/449
See application file for complete search history.

(56) References Cited

U.S. PATENT DOCUMENTS

2010/0068612 A1  3/2010 Nishikawa
2010/0291430 A1  11/2010 Lee et al.
(Continued)

FOREIGN PATENT DOCUMENTS

CN  103718338 A  4/2014
CN  106663770 A  5/2017
(Continued)

OTHER PUBLICATIONS

English Translation of Chinese Search Report dated Sep. 21, 2022, issued in counterpart CN application No. 201980077417.9. (3 pages).
(Continued)

*Primary Examiner* — Maria Laios
*Assistant Examiner* — Jordan E Berresford
(74) *Attorney, Agent, or Firm* — WHDA, LLP

(57) ABSTRACT

This non-aqueous electrolyte secondary battery comprises a positive electrode, a negative electrode, and a separator interposed between the positive electrode and the negative electrode. The separator includes; a porous base material; a first filler layer which contains phosphate particles as a primary component and is arranged on one surface of the base material; and a second filler layer which is arranged on the other surface of the base material and which contains at least one type of compound selected from the group consisting of an aromatic polyamide, an aromatic polyimide and (Continued)

an aromatic polyamideimide. The BET specific surface area of the phosphate particles is 5-100 m²/g. The content of the aforementioned compounds in the second filler layer 32 is 15 mass % or more.

7 Claims, 2 Drawing Sheets

(51) Int. Cl.
*H01M 10/0525* (2010.01)
*H01M 50/443* (2021.01)
*H01M 50/449* (2021.01)

(56) References Cited

U.S. PATENT DOCUMENTS

| | | |
|---|---|---|
| 2011/0171513 A1 | 7/2011 | Kuze et al. |
| 2014/0178741 A1 | 6/2014 | Hasegawa et al. |
| 2017/0229743 A1 | 8/2017 | Ito |
| 2019/0305278 A1* | 10/2019 | Saeki ............... H01M 10/0587 |
| 2022/0029243 A1 | 1/2022 | Sugimori et al. |

FOREIGN PATENT DOCUMENTS

| | | |
|---|---|---|
| JP | 2006-164873 A | 6/2006 |
| JP | 4243323 B2 | 3/2009 |
| JP | 2010-034044 A | 2/2010 |
| JP | 2011-503828 A | 1/2011 |
| JP | 2014-170661 A | 9/2014 |
| JP | 2015015096 A * | 1/2015 |
| JP | 2016-038967 A | 3/2016 |
| JP | 2016072120 A * | 5/2016 |
| JP | 2017-027772 A | 2/2017 |
| JP | WO2020/137562 A1 | 11/2021 |

OTHER PUBLICATIONS

Arakawa "Measurement of Specific Surface Area of Powder", Journal of the Research Association of Powder Technology, 1969, vol. 6, No. 1, pp. 31-38, cited in ISR dated Feb. 18, 2020, with partial translation. (9 pages).

International Search Report dated Feb. 18, 2020, issued in counterpart application No. PCT/JP2019/048585 with English translation. (6 pages).

* cited by examiner

NON-AQUEOUS ELECTROLYTE SECONDARY BATTERY

TECHNICAL FIELD

The present disclosure relates to a non-aqueous electrolyte secondary battery.

BACKGROUND

In non-aqueous electrolyte secondary batteries such as lithium ion batteries, an abnormal heat generation may occur due to excessive charging, internal short-circuiting, external short-circuiting, excessive resistive heating due to a large current, or the like. In the related art, as a technique for suppressing heat generation of the non-aqueous electrolyte secondary battery, there is known a shutdown function of a separator. The shutdown function is a function in which the separator melts due to the abnormal heat generation, so that pores of the separator are filled, resulting in blockage of ion conduction (movement of lithium ions) between a positive electrode and a negative electrode, and, consequently, suppression of an additional heat generation of the battery. For example, Patent Literature 1 discloses a separator for a non-aqueous electrolyte secondary battery in which a layer including aramid and aluminum oxide is formed over a surface of a porous base member having the shutdown function.

CITATION LIST

Patent Literature

Patent Literature 1: JP 4243323 B

SUMMARY

In recent years, with an increased demand for a higher capacity of a battery, employment of a thin film for the separator is considered. When a thickness of the separator is reduced, it becomes more difficult to realize the shutdown function during abnormal heat generation of the battery, resulting in difficulties in suppressing the additional heat generation of the battery.

An advantage of the present disclosure lies in provision of a non-aqueous electrolyte secondary battery which can suppress, when abnormal heat generation occurs in the battery, an additional heat generation of the battery.

According to one aspect of the present disclosure, there is provided a non-aqueous electrolyte secondary battery comprising: a positive electrode; a negative electrode; and a separator interposed between the positive electrode and the negative electrode, wherein the separator comprises: a porous base member; a first filler layer which contains phosphate particles as a primary component, and which is placed over one surface of the base member; and a second filler layer which contains one or more compounds selected from the group consisting of an aromatic polyamide, an aromatic polyimide, and an aromatic polyamideimide, and which is placed over the other surface of the base member, a BET specific surface area of the phosphate particles is greater than or equal to 5 $m^2/g$ and less than or equal to 100 $m^2/g$, and a content of the compound in the second filler layer is greater than or equal to 15 mass %.

According to a non-aqueous electrolyte secondary battery of one aspect of the present disclosure, when abnormal heat generation occurs, an additional heat generation of the battery can be suppressed.

DESCRIPTION OF EMBODIMENTS

Figure 1:
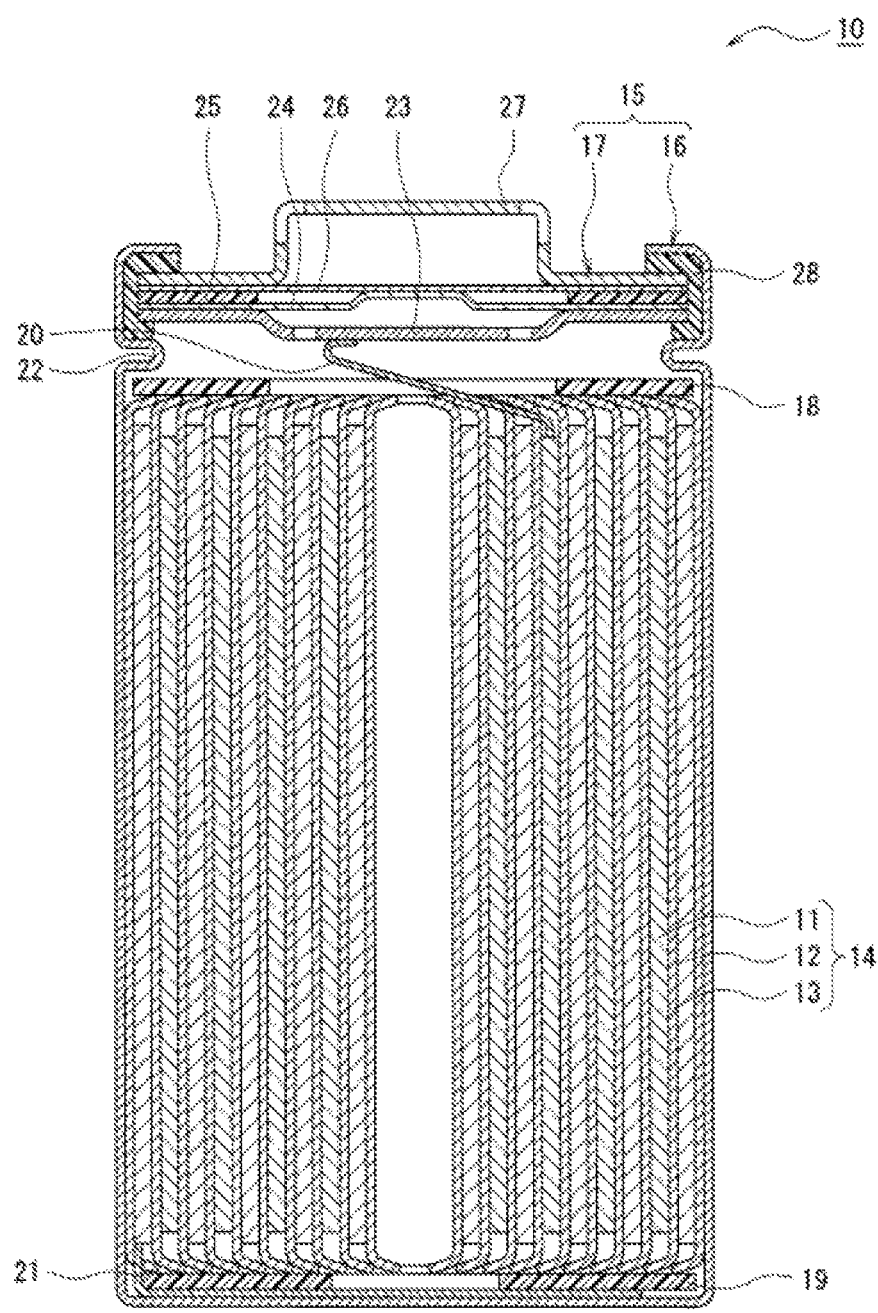
FIG. 1 is a cross sectional diagram of a non-aqueous electrolyte secondary battery according to an embodiment of the present disclosure.

Generally, a porous base member has a shutdown function. Therefore, when abnormal heat generation occurs in the battery, with the shutdown function of the base member, the ion conduction or the like between the positive and negative electrodes is blocked, and the additional heat generation of the battery is suppressed. However, when the thickness of the separator is reduced in response to the demand for higher capacity of the battery, there may occur cases in which the shape of the separator cannot be secured during the abnormal heat generation of the battery, and the shutdown function of the separator cannot be sufficiently realized. As a result, for example, the ion conduction or the like between the positive and negative electrodes cannot be sufficiently blocked, and suppression of the heat generation of the battery becomes difficult.

In view of the above-described circumstances, the present inventors have diligently studied, and found a non-aqueous electrolyte secondary battery which can suppress the additional heat generation of the battery when the abnormal heat generation of the battery occurs. Specifically, the non-aqueous electrolyte secondary battery comprises: a positive electrode; a negative electrode; and a separator interposed between the positive electrode and the negative electrode, wherein the separator comprises; a porous base member; a first filler layer which contains phosphate particles as a primary component, and which is placed over one surface of the base member; and a second filler layer which contains one or more compounds selected from the group consisting of an aromatic polyamide, an aromatic polyimide, and an aromatic polyamideimide, and which is placed over the other surface of the base member, a BET specific surface area of the phosphate particles is greater than or equal to 5 $m^2/g$ and less than or equal to 100 $m^2/g$, and a content of the compound in the second filler layer is greater than or equal to 15 mass %. According to this non-aqueous electrolyte secondary battery, the additional heat generation of the battery can be suppressed when the abnormal heat generation of the battery occurs. A mechanism for achieving the advantage is not sufficiently known, but the following may be deduced.

In the non-aqueous electrolyte secondary battery according to the present disclosure, when the abnormal heat generation occurs in the battery due to short-circuiting or the like, the phosphate particles contained in the first filler layer melt with the heat as an accelerating factor, polycondensation is thereby caused, pores of the porous base member are filled, and the shutdown function of the separator is improved. Further, the second filler layer which contains one or more compounds selected from the group consisting of the aromatic polyamide, the aromatic polyimide, and the aromatic polyamideimide in a certain amount has a high thermal endurance. Thus, by placing the second filler layer over the other surface of the porous base member, the second filler layer may act as a supporting member which suppresses deformation and contraction of the porous base member during the abnormal heat generation, and the shutdown function of the separator is thus maintained during the abnormal heat generation. From these, during the abnormal heat generation, for example, the movement of the lithium ions between the positive and negative electrode can be quickly blocked by the separator, the heat generation reaction during the short-circuiting can be sufficiently suppressed, and the additional heat generation of the battery can be suppressed.

Depending on an increase in temperature in the battery due to the internal short-circuiting of the battery, for example, gas having flammability or burnability (such as oxygen and hydrogen) may be generated from one of the electrodes. The gas may move to the other electrode and may react, in which case the heat generation of the battery is accelerated. According to the non-aqueous electrolyte secondary battery of the present disclosure, the movement of such gases can also be sufficiently blocked by the separator.

A non-aqueous electrolyte secondary battery according to an embodiment of the present disclosure will now be described in detail. In the following, a circular tubular battery will be exemplified in which a rolled type electrode element is housed in a circular tubular battery casing. However, the electrode element is not limited to the rolled type, and may alternatively be a layered type in which a plurality of positive electrodes and a plurality of negative electrodes are alternately layered, one by one, with a separator therebetween. The battery casing is not limited to the circular tubular shape, and may alternatively be a metal casing such as a polygonal shape (polygonal battery) and a coin shape (coin battery), or a resin casing (laminate battery) formed from a resin film.

FIG. 1 is a cross sectional diagram of a non-aqueous electrolyte secondary battery according to an embodiment of the present disclosure. As exemplified in FIG. 1, the non-aqueous electrolyte secondary battery 10 comprises an electrode element 14, a non-aqueous electrolyte, and a battery casing 15 which houses the electrode element 14 and the non-aqueous electrolyte. The electrode element 14 comprises a positive electrode 11, a negative electrode 12, and a separator 13 interposed between the positive electrode 11 and the negative electrode 12. The electrode element 14 has a rolled structure in which the positive electrode 11 and the negative electrode 12 are rolled with the separator 13 therebetween. The battery casing 15 is formed from an outer housing can 16 having a circular tubular shape with a bottom, and a sealing element 17 which closes an opening of the outer housing can 16.

The non-aqueous electrolyte includes a non-aqueous solvent and an electrolyte salt dissolved in the non-aqueous solvent. For the non-aqueous solvent, for example, esters, ethers, nitriles, amides, and a mixture solvent of two or more of these may be employed. Alternatively, the non-aqueous solvent may include a halogen substituted element in which at least a portion of hydrogens of these solvents is substituted with a halogen atom such as fluorine. The non-aqueous electrolyte is not limited to a liquid electrolyte, and may alternatively be a solid electrolyte. For the electrolyte salt, for example, a lithium salt such as $LiPF_6$ is used.

The outer housing can 16 is, for example, a metal container having a circular tubular shape with a bottom. A gasket 28 is provided between the outer housing can 16 and the sealing element 17, and a tightly-sealing property inside the battery is secured. The outer housing can 16 has a groove portion 22 which supports the sealing element 17, which is, for example, a protrusion of a portion of a side surface portion to an inner side. The groove portion 22 is desirably formed in an annular shape along a circumferential direction of the outer housing can 16, and supports the sealing element 17 with an upper surface thereof.

The sealing element 17 has a structure in which a bottom plate 23, a lower valve element 24, an insulating member 25, an upper valve element 26, and a cap 27 are layered in this order from a side of the electrode element 14. The constituting elements of the sealing element 17 has, for example, a circular disc shape or a ring shape, and members other than the insulating member 25 are electrically connected to each other. The lower valve element 24 and the upper valve element 26 are connected to each other at central portions thereof, and the insulating member 25 is interposed between peripheral portions of the lower and upper valve elements 24 and 26. When an internal pressure of the battery increases due to abnormal heat generation, the lower valve element 24 deforms to press the upper valve element 26 upward toward the side of the cap 27, and ruptures, so that a current path between the lower valve element 24 and the upper valve element 26 is broken. When the internal pressure further increases, the upper valve element 26 ruptures, and gas is discharged from an opening of the cap 27.

The non-aqueous electrolyte secondary battery 10 has insulating plates 18 and 19 respectively placed at upper and lower sides of the electrode element 14. In the example configuration of FIG. 1, a positive electrode lead 20 attached to the positive electrode 11 extends through a throughhole of the insulating plate 18 to a side of the sealing element 17, and a negative electrode lead 21 attached to the negative electrode 12 extends through an outer side of the insulating plate 19 to a side of the bottom of the outer housing can 16. The positive electrode lead 20 is connected to a lower surface of a bottom plate 23 of the sealing element 17 by welding or the like, so that the cap 27 of the sealing element 17 electrically connected to the bottom plate 23 acts as a positive electrode terminal. The negative electrode lead 21 is connected to an inner surface of the bottom of the outer housing can 16 by welding or the like, so that the outer housing can 16 acts as a negative electrode terminal.

Figure 2:
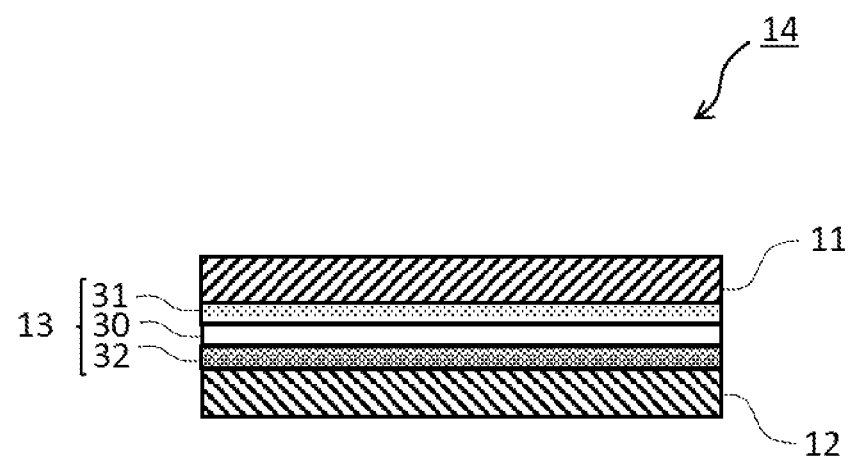
FIG. 2 is a partially enlarged cross sectional diagram showing an example of an electrode element shown in FIG. 1.

FIG. 2 is a partially enlarged cross sectional view showing an example of the electrode element shown in FIG. 1. The positive electrode, the negative electrode, and the separator will now be described with reference to FIG. 2.

[Positive Electrode]

The positive electrode 11 includes a positive electrode electricity collecting element and a positive electrode combined material layer formed over the electricity collecting element. For the positive electrode electricity collecting element, a foil of metal which is stable within a potential range of the positive electrode 11 such as aluminum, or a film in which the metal is placed on a surface layer, or the like may be employed. The positive electrode combined material layer includes a positive electrode active material, an electrically conductive material, and a binder material, and is desirably formed over both surfaces of the positive electrode electricity collecting element. The positive electrode 11 may be manufactured by applying a positive electrode combined material slurry including the positive electrode active material, the electrically conductive material, and the binder material over the positive electrode electricity collecting element, drying the applied film, and rolling the dried film, to form the positive electrode combined material layer over both surfaces of the positive electrode electricity collecting element. From a viewpoint of increased capacity of the battery, a density of the positive electrode combined material layer is greater than or equal to 3.6 g/cc, and is desirably greater than or equal to 3.6 g/cc and less than or equal to 4.0 g/cc.

As the positive electrode active material, a lithium-metal composite oxide containing metal elements such as Co, Mn, Ni, and Al may be exemplified. As the lithium-metal composite oxide, there may be exemplified $Li_xCoO_2$, $Li_xNiO_2$, $Li_xMnO_2$, $Li_xCo_yNi_{1-y}O_2$, $Li_xCo_yM_{1-y}O_z$, $Li_xNi_{1-y}M_yO_x$, $Li_xMn_2O_4$, $Li_xMn_{2-y}M_yO_4$, $LiMPO_4$, and $Li_2MPO_4F$ (wherein M is at least one of Na, Mg, Sc, Y, Mn, Fe, Co, Ni, Cu, Zn, Al, Cr, Pb, Sb, and B, $0.95 \leq x \leq 1.2$, $0.8 < y \leq 0.95$, and $2.0 \leq z \leq 2.3$).

As the electrically conductive material included in the positive electrode combined material layer, there may be exemplified carbon materials such as carbon black, acetylene black, Ketjen black, graphite, carbon nanotube, carbon nanofiber, graphene, or the like. As the binder material included in the positive electrode combined material layer, there may be exemplified a fluororesin such as polytetrafluoroethylene (PTFE), polyvinylidene fluoride (PVdF), polyacrylonitrile (PAN), polyimide, an acrylic resin, polyolefin, or the like. Alternatively, these resins may be employed along with carboxy methyl cellulose (CMC) or a salt thereof, polyethylene oxide (PEO), or the like.

[Negative Electrode]

The negative electrode 12 includes a negative electrode electricity collecting element and a negative electrode combined material layer formed over the electricity collecting element. For the negative electrode electricity collecting element, a foil of a metal which is stable within a potential range of the negative electrode 12 such as copper, a film in which the metal is placed on a surface layer, or the like may be employed. The negative electrode combined material layer includes a negative electrode active material and a binder material, and is desirably formed over both surfaces of the negative electrode electricity collecting element. The negative electrode 12 may be manufactured by applying a negative electrode combined material slurry including the negative electrode active material, the binder material, or the like over the negative electrode electricity collecting element, drying the applied film, and rolling the dried film, to form the negative electrode combined material layer over both surfaces of the negative electrode electricity collecting element.

As the negative electrode active material, no particular limitation is imposed so long as the material can reversibly occlude and release lithium ions. For example, carbon materials such as natural graphite, artificial graphite, or the like, a metal which forms an alloy with Li such as silicon (Si), tin (Sn), or the like, or an oxide including a metal element such as Si, Sn, or the like, may be employed. Alternatively, the negative electrode combined material layer may include a lithium-titanium composite oxide. The lithium-titanium composite oxide functions as the negative electrode active material. When the lithium-titanium composite oxide is employed, an electrically conductive material such as the carbon black is desirably added to the negative electrode combined material layer.

Similar to the positive electrode 11, for the binder material included in the negative electrode combined material layer, a fluororesin such as PTFE, PVdF, or the like, PAN, polyimide, an acrylic resin, polyolefin, or the like may be employed. When the negative electrode combined material slurry is prepared using a water-based solvent, as the binder material, there may be employed CMC or a salt thereof, styrene-butadiene rubber (SBR), polyacrylic acid (PAA) or a salt thereof, polyvinyl alcohol (PVA), or the like.

[Separator]

As exemplified in FIG. 2, the separator 13 includes a porous base member 30, a first filler layer 31, and a second filler layer 32. The first filler layer 31 contains phosphate particles as a primary component, and is placed over one surface (first surface) of the base member 30. Here, "containing phosphate particles as a primary component" means that, of the components included in the first filler layer 31, a ratio of the phosphate particles is the highest. The second filler layer 32 contains one or more compounds selected from the group consisting of an aromatic polyamide, an aromatic polyimide, and an aromatic polyamideimide, and is placed over the other surface (second surface) of the base member 30.

As shown in FIG. 2, in the separator 13, the layers may be layered in the order of the first filler layer 31/the base member 30/the second filler layer 32 from the side of the positive electrode 11, or may be layered in the order of the second filler layer 32/the base member 30/the first filler layer 31 from the side of the positive electrode 11, although showing of this configuration in the figure is omitted. The melting and the polycondensation of the phosphate particles contained in the first filler layer 31 may be caused not only by the heat when abnormality occurs in the battery, but also by a potential of the positive electrode 11 when the abnormality occurs in the battery. Therefore, from a viewpoint of a quick action of the shutdown function of the separator 13, desirably, the layers are layered in the order of the first filler layer 31/the base member 30/the second filler layer 32 from the side of the positive electrode 11; that is, the first filler layer 31 desirably abuts a surface of the positive electrode 11. In the separator 13, a plurality of the respective filler layers may be included within a range of not losing the objective of the present disclosure, or a layer other than the first filler layer 31 and the second filler layer 32 may be included.

In the separator 13 shown in FIG. 2, a portion of the phosphate particles of the first filler layer 31 desirably penetrates in pores of the base member 30.

The base member 30 is formed from a porous sheet having an ion permeating characteristic and an insulating characteristic such as, for example, a microporous thin film, a woven fabric, a non-woven fabric, or the like. As a resin forming the base member 30, there may be exemplified polyethylene, polypropylene, a polyolefin such as a copolymer of polyethylene and α-olefin, an acrylic resin, polystyrene, polyester, cellulose, or the like. The base member 30 is formed, for example, with polyolefin as a primary component, and may be formed substantially with polyolefin alone. The base member 30 may have a single layer structure, or a layered structure. No particular limitation is imposed on a thickness of the base member 30. The thickness is desirably, for example, greater than or equal to 3 μm and less than or equal to 20 μm.

A porosity of the base member 30 is desirably, for example, greater than or equal to 30% and less than or equal to 70%, in order to secure ion conductivity during charging and discharging of the battery. The porosity of the base member 30 is measured by the following method.

(1) Ten locations of the base member 30 are punched out in a circular shape with a diameter of 2 cm, and a thickness h and a mass w of a center part of a small piece of the base member 30 which is punched out are measured.

(2) From the thickness h and the mass w, a volume V and a mass W of the ten pieces are calculated, and the porosity ε is calculated from the following equation.

Porosity ε(%)=((ρV−W)/(ρV))×100 where ρ is a density of a material of the base member.

An average pore size of the base member 30 is, for example, greater than or equal to 0.01 μm and less than or equal to 0.5 μm, and is desirably greater than or equal to 0.03 μm and less than or equal to 0.3 μm. The average pore size of the base member 30 is measured using a perm-porometer (manufactured by Seika Corporation) which can measure a small pore size by a bubble point method (JIS K3832, ASTM F316-86). The maximum pore size of the base member 30 is, for example, greater than or equal to 0.05 μm and less than or equal to 1 μm, and is desirably greater than or equal to 0.05 μm and less than or equal to 0.5 μm.

As the phosphate particles contained in the first filler layer 31, there may be exemplified $Li_3PO_4$, LiPON, $Li_2HPO_4$, $LiH_2PO_4$, $Na_3PO_4$, $Na_2HPO_4$, $NaH_2PO_4$, $Zr_3(PO_4)_4$, $Zr(HPO_4)_2$, $HZr_2(PO_4)_3$, $K_3PO_4$, $K_2HPO_4$, $KH_2PO_4$, $Ca_3(PO_4)_2$, $CaHPO_4$, $Mg_3(PO_4)_2$, $MgHPO_4$, or the like. Of these, from a viewpoint of suppression of a secondary reaction or the like, one compound selected from lithium phosphate ($Li_3PO_4$), dilithium hydrogenphosphate ($Li_2HPO_4$), and lithium dihydrogenphosphate ($LiH_2PO_4$) is desirably employed.

It is sufficient that a BET specific surface area of the phosphate particles contained in the first filler layer 31 is greater than or equal to 5 $m^2/g$ and less than or equal to 100 $m^2/g$, but the BET specific surface area is desirably greater than or equal to 20 $m^2/g$ and less than or equal to 80 $m^2/g$. The BET specific surface area is measured according to a BET method (nitrogen adsorption method) of JIS R1626. In general, inconsideration of the temperature required for manufacture of a battery, an in-battery temperature during normal usage, and an in-battery temperature during abnormality, the phosphate particles desirably melt at a temperature of about 140° C. to about 190° C. The phosphate particle having the BET specific surface area within the above-described range easily melts at the temperature of about 140° C. to about 190° C. Thus, by using such a particle, the phosphates which melt and for which polycondensation occurs during abnormal heat generation of the battery can quickly fill the pores of the base member 30 (and quickly cover the surface of the positive electrode 11).

A content of the phosphate particles in the first filler layer 31 is set to an amount sufficient to fill the pores of the base member 30, and is, for example, greater than or equal to 90 mass %, with respect to a total mass of the first filler layer 31, and less than or equal to 98 mass %, and is desirably greater than or equal to 92 mass % and less than or equal to 98 mass %.

A volume-based 10% particle size ($D_{10}$) of the phosphate particles is desirably greater than or equal to 0.02 μm and less than or equal to 0.5 μm, is desirably greater than or equal to 0.03 μm and less than or equal to 0.3 μm, and is more desirably smaller than the average pore size of the base member 30. When these ranges are satisfied, a portion of the phosphate particles easily penetrates into the pores of the base member 30 at the time of manufacture of the separator 13, and the additional heat generation of the battery when the abnormal heat generation occurs in the battery can be more effectively suppressed.

Here, the volume-based 10% particle size ($D_{10}$) refers to a particle size in which, in a particle size distribution of the phosphate particles, a volume accumulation value becomes 10%. A 50% particle size ($D_{50}$) and a 90% particle size ($D_{90}$) to be described later refer to particle sizes in which, in the particle size distribution, the volume accumulation value becomes 50% and 90%, respectively. The 50% particle size ($D_{50}$) is also called a median size. The particle size distribution of the phosphate particles is measured by a laser diffraction method (a laser diffraction-scattering granularity distribution measurement apparatus). In the following, unless otherwise noted, the 10% particle size, the 50% particle size, and the 90% particle size refer to the volume-based particle sizes.

The 50% particle size ($D_{50}$) of the phosphate particles is, for example, desirably greater than or equal to 0.05 μm and less than or equal to 1 μm, and is more desirably greater than or equal to 0.1 μm and less than or equal to 1 μm. When the 50% particle size ($D_{50}$) of the phosphate particles is out of these ranges, the advantage of suppression of the additional heat generation of the battery during the abnormal heat generation of the battery may be reduced in comparison to cases in which the 50% particle size is within these ranges. The 50% particle size ($D_{50}$) of the phosphate particles may be smaller than the average pore size of the base member 30.

The 90% particle size ($D_{90}$) of the phosphate particles is desirably greater than the average pore size of the base member 30. The 90% particle size ($D_{90}$) is, for example, desirably greater than or equal to 0.2 μm and less than or equal to 2 μm, and is more desirably greater than or equal to 0.5 μm and less than or equal to 1.5 μm. When the $D_{90}$ is within these ranges, an amount of phosphate particles penetrating into the pores of the base member 30 at the time of manufacture of the separator 13 can be adjusted in an appropriate range, and the additional heat generation of the battery during the abnormal heat generation of the battery can be more effectively suppressed. When a depth of penetration of the phosphate particles in the base member 30 is too deep, the degree of heat generation may become greater.

In the separator 13, a portion of the phosphate particles of the first filler layer 31 penetrates into the pores of the base member 30, and an average value of the penetration depth of the particles is desirably greater than or equal to 0.1 μm and less than or equal to 2 μm, and is more desirably greater than or equal to 0.2 μm and less than or equal to 1.5 μm.

Here, the penetration depth of the phosphate particles refers to a length, along a thickness direction of the separator 13, from the first surface of the base member 30 to an end, of the particles which have penetrated into the base member 30, on a side opposite from the first surface. The penetration depth can be measured by a cross sectional observation of the base member 30 using a scanning electron microscope (SEM) or a transmission electron microscope.

The phosphate particles desirably penetrate into the pores over an approximately entire region of the first surface of the base member 30. That is, the phosphate particles which have penetrated into the pores exist approximately uniformly over the first surface of the base member 30. In addition, the penetration depth of the phosphate particles is desirably approximately uniform over an approximately entire region of the first surface of the base member 30.

An average value of the penetration depth of the phosphate particles is, for example, greater than or equal to 1% and less than or equal to 50% with respect to the thickness of the base member 30, and is desirably greater than or equal to 5% and less than or equal to 30%. By adjusting the 10% particle size ($D_{10}$) of the phosphate particles or the like according to the average pore size of the base member 30, it becomes possible to control the depth of the phosphate particles penetrating into the base member 30.

A thickness of the first filler layer 31 over the base member 30 (thickness obtained by subtracting the penetration depth of the phosphate particles) is desirably greater than or equal to 0.5 μm and less than or equal to 2 μm, from the viewpoint of effectively suppressing the additional heat generation of the battery during the abnormal heat generation of the battery, or the like.

The first filler layer 31 is, for example, a porous layer, and pores through which the lithium ions pass are formed therein. A porosity of the first filler layer 30 is desirably greater than or equal to 30% and less than or equal to 70%, from the viewpoints of securing a superior ion conductivity during charging or discharging of the battery, of securing a physical strength, and the like. The porosity of the first filler layer 31 is calculated by the following equation (the same equation applies to the porosity of the second filler layer 32).

$$\text{Porosity of first filler layer (\%)}=100-[[W \div (d \times \rho)] \times 100]$$

where W is a mass per unit area of the first filler layer (g/cm$^2$), d is a thickness of the first filler layer (cm), and ρ is an average density of the first filler layer (g/cm$^3$).

The first filler layer 31 desirably includes a binder material in addition to the phosphate particles. A content of the binder material is, for example, greater than or equal to 2 mass % and less than or equal to 8 mass %, with respect to a total mass of the first filler layer 31, from the viewpoint of securing a strength of the first filler layer 31, or the like.

As the binder material included in the first filler layer 31, there may be exemplified a polyolefin such as polyethylene, polypropylene, and a copolymer of polyethylene and α-olefin, a fluororesin such as PVdF, PTFE, and polyvinyl fluoride (PVF), a fluorine-containing rubber such as a copolymer of vinylidene fluoride-hexafluoropropylene-tetrafluoroethylene, and a copolymer of ethylene-tetrafluoroethylene, a copolymer of styrene-butadiene and a hydride thereof, a copolymer of acrylonitrile-butadiene and a hydride thereof, a copolymer of acrylonitrile-butadiene-styrene and a hydride thereof, a copolymer of ester methacrylate-ester acrylate, a copolymer of styrene-ester acrylate, a copolymer of acrylonitrile-ester acrylate, polyvinyl acetate, polyphenylene ether, polysulfone, polyether sulfone, polyphenylene sulfide, polyether imide, polyamideimide, polyamide, poly N-vinyl acetamide, polyester, polyacrylonitrile, cellulose, a copolymer of ethylene-vinyl acetate, polyvinyl chloride, isoprene rubber, butadiene rubber, methyl polyacrylate, ethyl polyacrylate, polyvinyl alcohol, CMC, acrylamide, PVA, methyl cellulose, guar gum, sodium alginate, carrageenan, and xanthan gum, and salts thereof.

The first filler layer 31 may further include heteropoly acid. It can be deduced that, by adding the heteropoly acid, polycondensation of the melted phosphates may be promoted. As the heteropoly acid, there may be exemplified phosphomolybdic acid, phosphotungstic acid, phosphomolybdotungstic acid, phosphomolybdovanadic acid, phosphomolybdotungstovanadic acid, phosphotungstovanadic acid, tungstosilisic acid, molybdosilisic acid, molybdotungstosilisic acid, and molybdotungstovanadosilisic acid.

The first filler layer 31 may be formed by applying a slurry-state composition (first slurry), for example, including phosphate particle, the binder material, and a dispersion medium, over a surface of the base member 30, and drying the applied film. The first slurry may be applied by a conventionally known method such as gravure printing or the like. In order to cause a portion of the phosphate particles to penetrate into the pores of the base member 30 and set the average value of the penetration depth of the particles to be greater than or equal to 0.1 μm and less than or equal to 2 μm, desirably, phosphate particles are used having the 10% particle size ($D_{10}$) which is smaller than the average pore size of the base member 30.

The penetration depth of the phosphate particles may also be controlled by, in addition to the adjustment of the particle size of the phosphate particles, the type of the dispersion medium included in the first slurry, a drying condition of the applied film of the first slurry, a method of application of the first slurry, or a combination of these. For example, when a dispersion medium having a superior affinity with the base member 30 is used or when the drying condition of the applied film is set milder, it becomes easier for the phosphate particles to penetrate into the base member 30. In addition, the penetration depth of the phosphate particles may be controlled by adjusting a rotational speed of a gravure roll used for the application of the first slurry. When the rotational speed of the gravure roll is decreased, it becomes easier for the phosphate particles to penetrate into the base member 30.

It is sufficient that a content of one or more compounds selected from the group consisting of the aromatic polyamide, the aromatic polyimide, and the aromatic polyamideimide in the second filler layer 32 may be greater than or equal to 15 mass % with respect to a total mass of the second filler layer 32, but the content is desirably greater than or equal to 20 mass % and less than or equal to 40 mass %. When the content of the compound is less than 15 mass %, a thermal endurance of the second filler layer 32 is reduced, and the deformation and the contraction of the base member 30 during the abnormal heat generation of the battery cannot be suppressed. The second filler layer 32 desirably include at least the aromatic polyamide, from the viewpoint of the thermal endurance.

As the aromatic polyamide, for example, there may be exemplified a meta-oriented aromatic polyamide and a para-oriented aromatic polyamide. The meta-oriented aromatic polyamide is substantially formed from a repetitious unit in which an amide bond is bonded at a meta position of an aromatic ring or a similar orientation position (such as, for example, 1,3-phenylene, 3,4'-biphenylene, 1,6-naphthalene, 1,7-naphthalene, 2,7-naphthalene, or the like), and is obtained by condensation polymerization of a meta-oriented aromatic diamine and a meta-oriented aromatic dicarboxylic acid dichloride. More specifically, there may be exemplified polymetaphenylene isophthalamide, poly(metabenzamide), poly(3,4'-benzanilide isophthalamide), poly(metaphenylene-3,4'-biphenylene dicarboxylic acid amide), poly(metaphenylene-2,7-naphthalene dicarboxylic acid amide), and the like. On the other hand, the para-oriented aromatic polyamide is substantially formed from a repetitious unit in which the amide bond is bonded at a para position of the aromatic ring or a similar orientation position (such as, for example, an orientation position extending in opposing directions coaxially or in parallel such as 4,4'-biphenylene, 1,5-naphthalene, and 2,6-naphthalene), and is obtained by condensation polymerization of a para-oriented aromatic diamine and para-oriented aromatic dicarboxylic acid dihalide. More specifically, there may be exemplified poly(paraphenylene terephthal amide), poly(parabenzamide), poly(4,4'-benzanilide terephthalamide), poly(paraphenylene-4,4'-biphenylene dicarboxylic acid amide), poly(paraphenylene-2,6-naphthalene dicarboxylic acid amide), poly(2-chloro-paraphenylene terephthal amide), and a copolymer of paraphenylene diamine, 2,6-dichloro paraphenylene diamine, and terephthalic acid dichloride.

As the aromatic polyimide, there may be exemplified, for example, those obtained by condensation polymerization of an aromatic diacid anhydride and diamine. As the diacid anhydride, there may be exemplified pyromellitic dianhydride, 3,3',4,4'-diphenyl sulfone tetracarboxylic dianhydride, 3,3',4,4'-benzophenone tetracarboxylic dianhydride, 2,2'-bis(3,4-dicarboxyphenyl) hexafluoropropane, and 3,3',4,4'-biphenyl tetracarboxylic dianhydride. As the diamine, there may be exemplified oxydianiline, paraphenylene diamine, benzophenone amine, 3,3'-methylene dianiline, 3,3'-diaminobenzophenone, and 3,3'-diaminobenzosulfone.

As the aromatic polyamideimide, there may be exemplified, for example, those obtained by condensation polymerization of an aromatic dicarboxylic acid and an aromatic di-isocyanate, or of an aromatic diacid anhydride and an aromatic di-isocyanate. As the aromatic dicarboxylic acid, there may be exemplified isophthalic acid and terephthalic acid. As the aromatic diacid anhydride, there may be exemplified trimellitic anhydride. As the aromatic di-isocyanate, there may be exemplified 4,4'-diphenyl methane di-isocyanate, 2,4-tolylene di-isocyanate, 2,6-tolylene di-isocyanate, orthotolylene di-isocyanate, and m-xylene di-isocyanate.

The second filler layer 32 desirably includes, in addition to the above-described compounds, for example, inorganic particles and a binder material having a high melting point (thermal endurance).

The inorganic particle is desirably formed from, for example, an inorganic compound of insulating characteristic, which does not melt or decompose during the abnormal heat generation of the battery. Examples of the inorganic particle include metal oxides, metal oxide hydrates, metal hydroxides, metal nitrides, metal carbides, metal sulfides, or the like. The $D_{50}$ of the inorganic particles is, for example, greater than or equal to 0.2 μm and less than or equal to 2 μm.

Examples of the metal oxides and the metal oxide hydrates include aluminum oxide (alumina), boehmite ($Al_2O_3H_2O$ or $AlOOH$), magnesium oxide, titanium oxide, zirconium oxide, silicon oxide, yttrium oxide, zinc oxide, or the like. Examples of the metal nitrides include silicon nitride, aluminum nitride, boron nitride, titanium nitride, or the like. Examples of the metal carbides include silicon carbide, boron carbide, or the like. Examples of the metal sulfides include barium sulfate or the like. Examples of the metal hydroxides include aluminum hydroxide or the like. For a melting point of substances such as boehmite, for example, which melts after being altered to alumina, desirably, the melting point of the substance after the alteration is higher than the melting point of the phosphate particle.

Alternatively, the inorganic particle may be porous aluminosilicate such as zeolite ($M_{2/n}O \cdot Al_2O_3 \cdot xSiO_2 \cdot yH_2O$, wherein M is a metal element, x≥2, and y≥0) a laminar silicate such as talc ($Mg_3Si_4O_{10}(OH)_2$), barium titanate ($BaTiO_3$), strontium titanate ($SrTiO_3$), or the like. In particular, from the viewpoints of the insulating characteristic, the thermal endurance, and the like, desirably, at least one compound selected from aluminum oxide, boehmite, talc, titanium oxide, and magnesium oxide is employed.

A content of the inorganic particles in the second filler layer 32 is desirably greater than or equal to 30 mass % and less than or equal to 85 mass % with respect to a total mass of the second filler layer 32, and is more desirably greater than or equal to 40 mass % and less than or equal to 80 mass %. The content of the binder material in the second filer layer 32 is desirably, for example, greater than or equal to 2 mass % and less than or equal to 8 mass %. For the binder material included in the second filler layer 32, a material similar to that of the binder material included in the first filler layer 31 may be employed. No particular limitation is imposed on a thickness of the second filler layer, but the thickness is desirably greater than or equal to 1 μm and less than or equal to 5 μm, and more desirably greater than or equal to 2 μm and less than or equal to 4 μm.

The second filler layer 32 is, for example, a porous layer, and pores through which the lithium ions pass are formed therein. Similar to the first filler layer 31, a porosity of the second filler layer 32 is desirably greater than or equal to 30% and less than or equal to 70%.

Similar to the first filler layer 31, the second filler layer 32 may be formed by, for example, applying a slurry-state composition (second slurry) including one or more compounds selected from the group consisting of the aromatic polyamide, the aromatic polyimide, and the aromatic polyamideimide, the inorganic particles, the binder material, and the dispersion medium, over a surface of the base member 30, and drying the applied film. For the dispersion medium, for example, NMP may be employed.

EXAMPLES

The present disclosure will now be further described with reference to Examples. The present disclosure, however, is not limited to these Examples.

Example 1

[Manufacture of Separator]
With the following process, a separator was manufactured, having a three-layer structure of a first filler layer containing phosphate particles/a polyethylene porous base member/a second filler layer containing aromatic polyamide.
(1) Preparation of First Slurry
Lithium phosphate particles ($Li_3PO_4$) having a BET specific surface area of 6.5 $m^2$/g, a $D_{10}$ of 0.49 μm, a $D_{50}$ of 0.72 μm, and a $D_{90}$ of 1.01 μm, and poly N-vinyl acetamide were mixed in a mass ratio of 92:8, and N-methyl-2-pyrrolidone (NMP) was added, to prepare a first slurry having a solid content concentration of 15 mass %.
(2) Preparation of Second Slurry
N-methyl-2-pyrrolidone and calcium chloride were mixed with a mass ratio of 94.2:5.8, and a temperature of the mixture was increased to about 80° C., to completely dissolve calcium chloride. The solution was returned to the room temperature, 2200 g of the solution was extracted, and 0.6 mol of paraphenylene diamine (PPD) was added and completely dissolved. While the solution was maintained at about 20° C., 0.6 mol of terephthalic acid dichloride (TPC) was added a small amount by a small amount. Then, the solution was matured for 1 hour while the temperature was maintained at 20° C., to form a polymerized solution. Then, 100 g of the polymerized solution and an NMP solution in which 5.8 mass % of calcium chloride is dissolved were mixed, to obtain a solution having a concentration of paraphenylene terephthal amide (PPTA), which is an aromatic polyamide, of 2 mass %. To the solution, alumina was mixed as a ceramic powder in an amount of 100 mass % with respect to 50 mass parts of aromatic polyamide, to prepare a second slurry.
(3) Formation of First Filler Layer
Over one surface of a polyethylene porous base member of a single layer having a thickness of 12 μm, the first slurry was applied by a wire bar in such a manner that a thickness of the layer after drying was 2 μm, and the applied film was dried at 60° C. for 5 minutes, to form the first filler layer.
(4) Formation of Second Filler Layer Over the other surface of the polyethylene porous base member, the second slurry was applied in a slot-die method in such a manner that a thickness of the layer after drying was 2 μm, and was left for 1 hour under atmosphere of a temperature of 25° C. and a relative humidity of 70% so that the aromatic polyamide is precipitated. Then, NMP and calcium chloride were removed by water washing, and the layer was dried at 60° C. for 5 minutes, to form the second filler layer.

[Manufacture of Positive Electrode]

A lithium-composite oxide particle represented by $Li_{1.05}Ni_{0.82}Co_{0.15}Al_{0.03}O_2$ was used as the positive electrode active material. The positive electrode active material, carbon black, and PVdF were mixed in NMP with a mass ratio of 100:1:1, to prepare a positive electrode combined material slurry. Then, the positive electrode combined material slurry was applied over both surfaces of a positive electrode electricity collecting element formed from an aluminum foil, the applied film was dried and rolled by a rolling roller, and an electricity collecting tab made of aluminum was attached, to manufacture a positive electrode in which the positive electrode combined material layer was formed on both surfaces of the positive electrode electricity collecting element. A filling density of the positive electrode combined material was 3.70 g/cm$^3$.

[Manufacture of Negative Electrode]

Artificial graphite, sodium carboxy methyl cellulose (CMC-Na), and a dispersion of styrene-butadiene rubber (SBR) were mixed in water with a solid content mass ratio of 98:1:1, to prepare a negative electrode combined material slurry. Then, the negative electrode combined material slurry was applied over both surfaces of a negative electrode electricity collecting element formed from copper, the applied film was dried and rolled by a rolling roller, and an electricity collecting tab formed from nickel was attached, to manufacture a negative electrode in which the negative electrode combined material layer was formed over both surfaces of the negative electrode electricity collecting element. A filling density of the negative electrode combined material was 1.70 g/cm$^3$.

[Preparation of Non-Aqueous Electrolyte]

To a mixture solvent in which ethylene carbonate (EC), ethylmethyl carbonate (EMC), and dimethyl carbonate (DMC) were mixed with a volume ratio of 3:3:4, lithium hexafluorophosphate (LiPF$_6$) was dissolved in a concentration of 1 mol/liter. Further, vinylene carbonate (VC) was dissolved in the mixture solvent in a concentration of 1 mass %, to prepare the non-aqueous electrolyte.

[Manufacture of Non-Aqueous Electrolyte Secondary Battery]

The positive electrode and the negative electrode described above were rolled with the separator described above therebetween, and heat-press molded at 80° C., to manufacture a flat-shape, rolled electrode element. In this process, in order to cause the first filler layer to abut the surface of the positive electrode, the separator was placed in a manner that the surface on which the first filler layer was formed faced the positive electrode side. The electrode element was housed in a battery outer housing structure formed from aluminum laminated sheets, the non-aqueous electrolyte was filled, and the outer housing structure was sealed, to manufacture a non-aqueous electrolyte secondary battery of 750 mAh.

[Nail Penetration Test]

Under an environment of 25° C., the non-aqueous electrolyte secondary battery described above was charged with a constant current of 150 mA until a battery voltage reached 4.2V, and then, was charged at a constant voltage of 4.2V until the current value becomes 37.5 mA. Under an environment of 25° C., a tip of a wire nail having a size of 1 mmφ was vertically penetrated at a rate of 0.1 mm/second through a center part of a side surface of the battery in the above-described charge state, and the nail penetration was stopped when the nail penetrates to a first layer of the positive electrode. A maximum reaching temperature at a location, of the side surface portion of the battery, 5 mm distanced from the location of penetration of the nail was measured. TABLE 1 shows the measurement result.

Example 2

Anon-aqueous electrolyte secondary battery was manufactured in a manner similar to Example 1 except that, in the preparation of the first slurry, a lithium phosphate particle (Li$_3$PO$_4$) was used having the BET specific surface area of 32 m$^2$/g, the D$_{10}$ of 0.25 μm, the D$_{50}$ of 0.51 μm, and the D$_{90}$ of 0.81 μm, and the nail penetration test was performed.

Example 3

Anon-aqueous electrolyte secondary battery was manufactured in a manner similar to Example 1 except that, in the preparation of the first slurry, a lithium phosphate particle (Li$_3$PO$_4$) was used having the BET specific surface area of 66 m$^2$/g, the D$_{10}$ of 0.15 μm, the D$_{50}$ of 0.26 μm, and the D$_{90}$ of 0.55 μm, and the nail penetration test was performed.

Example 4

Anon-aqueous electrolyte secondary battery was manufactured in a manner similar to Example 1 except that the separator of Example 2 was used, and the separator was placed with the surface over which the second filler layer was formed facing the positive electrode side so that the second filler layer abuts the positive electrode surface, and the nail penetration test was performed.

Comparative Example 1

Anon-aqueous electrolyte secondary battery was manufactured in a manner similar to Example 1 except that, in the preparation of the first slurry, a lithium phosphate particle (Li$_3$PO$_4$) was used having the BET specific surface area of 3.3 m$^2$/g, the D$_{10}$ of 0.62 μm, the D$_{50}$ of 0.97 μm, and the D$_{90}$ of 1.38 μm, and the nail penetration test was performed.

Comparative Example 2

Anon-aqueous electrolyte secondary battery was manufactured in a manner similar to Example 1 except that, in the preparation of the first slurry, a lithium phosphate particle (Li$_3$PO$_4$) was used having the BET specific surface area of 32 m$^2$/g, the D$_{10}$ of 0.25 μm, the D$_{50}$ of 0.51 μm, and the D$_{90}$ of 0.87 μm, and that the second filler layer was not formed in the manufacture of the separator, and the nail penetration test was performed.

Comparative Example 3

Anon-aqueous electrolyte secondary battery was manufactured in a manner similar to Example 1 except that, in the manufacture of the separator, the first filler layer was not formed, and the separator was placed with the surface over which the second filler layer was formed facing the positive electrode side so that the second filler layer abuts the positive electrode surface, and the nail penetration test was performed.

TABLE 1

| | FIRST FILLER LAYER CONTAINING PHOSPHATE PARTICLES | BET OF PHOSPHATE PARTICLES/ ($m^2$/g) | SECOND FILLER LAYER CONTAINING ARAMID | FILLER LAYER ABUTTING POSITIVE ELECTRODE | NAIL PENETRATION TEST OF BATTERY MAXIMUM REACHING TEMPERATURE/ °C. |
|---|---|---|---|---|---|
| EXAMPLE 1 | PRESENT | 6.5 | PRESENT | FIRST FILLER LAYER | 451 |
| EXAMPLE 2 | PRESENT | 32 | PRESENT | FIRST FILLER LAYER | 440 |
| EXAMPLE 3 | PRESENT | 66 | PRESENT | FIRST FILLER LAYER | 436 |
| EXAMPLE 4 | PRESENT | 32 | PRESENT | SECOND FILLER LAYER | 447 |
| COMPARATIVE EXAMPLE 1 | PRESENT | 3.3 | PRESENT | FIRST FILLER LAYER | 471 |
| COMPARATIVE EXAMPLE 2 | PRESENT | 32 | ABSENT | FIRST FILLER LAYER | 475 |
| COMPARATIVE EXAMPLE 3 | ABSENT | — | PRESENT | SECOND FILLER LAYER | 479 |

As can be seen from TABLE 1, all of the batteries of the Examples showed a lower maximum reaching temperature in the nail penetration test in comparison to the batteries of the Comparative Examples. In other words, according to the batteries of the Examples, the additional heat generation of the battery during abnormal heat generation was suppressed.

REFERENCE SIGNS LIST

10 non-aqueous electrolyte secondary battery
11 positive electrode
12 negative electrode
13 separator
14 electrode element
15 battery casing
16 outer housing can
17 sealing element
18, 19 insulating plate
20 positive electrode lead
21 negative electrode lead
22 groove portion
23 bottom plate
24 lower valve element
25 insulating member
26 upper valve element
27 cap
28 gasket
30 base member
31 first filler layer
32 second filler layer.

The invention claimed is:
1. A non-aqueous electrolyte secondary battery comprising:
   a positive electrode;
   a negative electrode; and
   a separator interposed between the positive electrode and the negative electrode, wherein
   the separator comprises:
   a porous base member that comprises polyolefin as a primary component;
   a first filler layer which contains phosphate particles as a primary component, and which is placed over one surface of the porous base member; and
   a second filler layer which contains one or more compounds selected from the group consisting of an aromatic polyamide, an aromatic polyimide, and an aromatic polyamideimide, and which is placed over the other surface of the porous base member,
   a BET specific surface area of the phosphate particles is greater than or equal to 5 $m^2$/g and less than or equal to 100 $m^2$/g,
   a content of the compound in the second filler layer is greater than or equal to 15 mass %,
   a portion of the phosphate particles penetrates into pores of the porous base member, and
   an average value of a penetration depth of the phosphate particles is greater than or equal to 0.1 μm and less than or equal to 2 μm.
2. The non-aqueous electrolyte secondary battery according to claim 1, wherein
   the content of the compound in the second filler layer is greater than or equal to 20 mass % and less than or equal to 40 mass %.
3. The non-aqueous electrolyte secondary battery according to claim 1, wherein
   a content of the phosphate particles in the first filler layer is greater than or equal to 90 mass % and less than or equal to 99 mass %.
4. The non-aqueous electrolyte secondary battery according to claim 1, wherein
   the first filler layer abuts a surface of the positive electrode.
5. The non-aqueous electrolyte secondary battery according to claim 1, wherein
   the second filler layer abuts a surface of the positive electrode.
6. The non-aqueous electrolyte secondary battery according to claim 1, wherein
   a volume-based 10% particle size ($D_{10}$) of the phosphate particles is greater than or equal to 0.02 μm and less than or equal to 0.5 μm.
7. The non-aqueous electrolyte secondary battery according to claim 1, wherein
   a thickness of a portion of the first filler layer which overlies the porous base member, except the portion of the phosphate particles penetrating into the pores of the porous base member, is greater than or equal to 0.5 μm and less than or equal to 2 μm.

\* \* \* \* \*